(12) United States Patent
Ko et al.

(10) Patent No.: US 11,902,918 B2
(45) Date of Patent: Feb. 13, 2024

(54) METHOD FOR TRANSMITTING AND RECEIVING SIGNALS IN WIRELESS COMMUNICATION SYSTEM, AND DEVICE SUPPORTING SAME

(71) Applicant: LG Electronics Inc., Seoul (KR)

(72) Inventors: Hyunsoo Ko, Seoul (KR); Youngsub Kim, Seoul (KR); Hanbyul Seo, Seoul (KR); Sukhyon Yoon, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 456 days.

(21) Appl. No.: 17/287,365

(22) PCT Filed: Nov. 4, 2019

(86) PCT No.: PCT/KR2019/014825
§ 371 (c)(1),
(2) Date: Apr. 21, 2021

(87) PCT Pub. No.: WO2020/091555
PCT Pub. Date: May 7, 2020

(65) Prior Publication Data
US 2021/0314886 A1    Oct. 7, 2021

(30) Foreign Application Priority Data

Nov. 2, 2018 (KR) .......... 10-2018-0133939

(51) Int. Cl.
H04W 56/00        (2009.01)
H04L 27/26        (2006.01)
H04W 4/40         (2018.01)

(52) U.S. Cl.
CPC ....... *H04W 56/001* (2013.01); *H04L 27/2605* (2013.01); *H04W 4/40* (2018.02)

(58) Field of Classification Search
CPC .................. H04W 56/001; H04L 27/2605
See application file for complete search history.

(56) References Cited

U.S. PATENT DOCUMENTS

2016/0286506 A1    9/2016 Chae et al.
2017/0272299 A1*   9/2017 Chae ............ H04L 5/0048
(Continued)

OTHER PUBLICATIONS

Ericsson, "NR synchronization signal design," R1-1708719, 3GPP TSG-RAN WG1 Meeting #89, Hangzhou, China, dated May 15-19, 2017, 8 pages.

(Continued)

*Primary Examiner* — Zhiren Qin
(74) *Attorney, Agent, or Firm* — Fish & Richardson P.C.

(57) ABSTRACT

The present invention relates to a wireless communication system, and in particular, to a method and a device therefor, in which a sequence for a primary sidelink synchronization signal (PSSS) is generated on the basis of a specific cyclic shift value, and the PSSS is transmitted to a second device on the basis of the generated sequence, wherein the specific cyclic shift value is one of a plurality of first cyclic shift values for the PSSS, the plurality of first cyclic shift values are on the basis of a certain ratio being applied to offsets of second cyclic shift values for a downlink primary synchronization signal (DL PSS) sequence, and the intervals between the plurality of first cyclic shift values are maximized.

11 Claims, 18 Drawing Sheets

(56) References Cited

U.S. PATENT DOCUMENTS

2018/0042050 A1* 2/2018 Kim .................... H04J 13/0062
2018/0152987 A1   5/2018 Ro et al.
2018/0279294 A1* 9/2018 Gao ..................... H04L 5/0021
2021/0235404 A1* 7/2021 Li ...................... H04W 56/0015
2021/0321384 A1* 10/2021 Osawa ................. H04L 5/0048

OTHER PUBLICATIONS

ITL, "Considerations on sidelink synchronization signal design for NR V2X," R1-1811444, 3GPP TSG RAN WG1 Meeting #94-bis, Chengdu, China, dated Oct. 8-12, 2018, 5 pages.
LG Electronics, "Discussion on NR sidelink synchronization," R1-1810282, 3GPP TSG RAN WG1 Meeting #94bis, Chengdu, China, dated Oct. 8-12, 2018, 8 pages.
LG Electronics, "Discussion on sidelink synchronization for NR V2X," R1-1812843, 3GPP TSG RAN WG1 Meeting #95, Spokane, USA, dated Nov. 12-16, 2018, 9 pages.
PCT International Search Report and Written Opinion in International Appln. No. PCT/KR2019/014825, dated Feb. 7, 2020, 14 pages (with English translation).

* cited by examiner (a)

(b)

(a)

(b)

METHOD FOR TRANSMITTING AND RECEIVING SIGNALS IN WIRELESS COMMUNICATION SYSTEM, AND DEVICE SUPPORTING SAME

CROSS-REFERENCE TO RELATED APPLICATIONS

This application is a National Stage application under 35 U.S.C. § 371 of International Application No. PCT/KR2019/014825, filed on Nov. 4, 2019, which claims the benefit of Korean Application No. 10-2018-0133939, filed on Nov. 2, 2018. The disclosures of the prior applications are incorporated by reference in their entirety.

TECHNICAL FIELD

The present disclosure relates to a method and apparatus used in a wireless communication system and, more particularly, to a method of transmitting and receiving signals in a wireless communication system and an apparatus supporting the same.

BACKGROUND

The necessity for mobile broadband communication more improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low-latency communication (URLLC), etc. has been discussed. In the present disclosure, the corresponding technology is referred to as new radio access technology (NR), for convenience of description.

SUMMARY

An object of the present disclosure is to provide a method of transmitting and receiving a signal in a wireless communication system and an apparatus supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method of transmitting and receiving a signal in a wireless communication system and an apparatus supporting the same.

According to an aspect of the present disclosure, provided herein is a communication method by a first device in a wireless communication system, including generating a sequence for a primary sidelink synchronization signal (PSSS) based on a specific cyclic shift; and transmitting the PSSS to a second device based on the generated sequence, wherein the specific cyclic shift value is one of a plurality of first cyclic shift values for the PSSS, wherein the first cyclic shift values are generated by applying a predetermined ratio to an offset of second cyclic shift values for a downlink (DL) primary synchronization signal (PSS) sequence, and wherein an interval between the first cyclic shift values is maximized.

According to an aspect of the present disclosure, provided herein is a first device used in a wireless communication system, including a memory and a processor, wherein the processor generates a sequence for a primary sidelink synchronization signal (PSSS) based on a specific cyclic shift, and transmits the PSSS to a second device based on the generated sequence, wherein the specific cyclic shift value is one of a plurality of first cyclic shift values for the PSSS, wherein the first cyclic shift values are generated by applying a predetermined ratio to an offset of second cyclic shift values for a downlink (DL) primary synchronization signal (PSS) sequence, and wherein an interval between the first cyclic shift values is maximized.

The first cyclic shift values may be determined based on a ceiling operation or a floor operation with respect to ½ of the offset of the second cyclic shift values.

The second cyclic shift values may be determined as (0, 43, 86), and the first cyclic shift values may be determined as (21, 64, 107) or (22, 65, 108).

The PSSS may be generated based on two cyclic shift values among the second cyclic shift values.

A first sequence of a secondary sidelink synchronization signal (SSSS) may be generated based on fourth cyclic shift values not included in third cyclic shift values for a downlink (DL) secondary synchronization signal (SSS); a second sequence of the SSSS may be generated based on a sixth cyclic shift value determined based on fifth cyclic shift values for the DL SSS; and the SSS may be transmitted to the second device based on the first sequence of the SSSS and the second sequence of the SSSS.

Candidate sequences generated by multiplication of elements of the first sequence of the SSSS and elements of the second sequence of the SSSS may be divided into three groups, and a sequence for at least partial groups selected based on the number of sequences of the PSSS, among the three groups, may be used.

The fourth cyclic shift values may have the same offset as the third cyclic shift values and may not overlap with the third cyclic shift values, and the sixth cyclic shift values may have the same offset as the fifth cyclic shift values, and the sixth cyclic shift values may be equal to the fifth cyclic shift values or may not overlap with the fifth cyclic shift values.

A device applied to an embodiment of the present disclosure may include an autonomous driving device.

The foregoing aspects of the present disclosure are merely a part of the embodiments of the present disclosure and various embodiments into which the features of the present disclosure are incorporated may be derived and understood by persons skilled in the art from the following detailed description of the present disclosure.

According to embodiments of the present disclosure, a synchronization signal sequence for sidelink may be efficiently generated based on a downlink synchronization signal sequence.

The effects that may be achieved with embodiments of the present disclosure are not limited to what has been particularly described hereinabove and other advantages not described herein will be more clearly understood by persons skilled in the art from the following detailed description of the present disclosure. That is, unintended effects in implementing the present disclosure may also be derived by those skilled in the art from the embodiments of the present disclosure.

BRIEF DESCRIPTION OF THE DRAWINGS

The accompanying drawings, which are included to provide a further understanding of the disclosure, illustrate embodiments of the present disclosure and together with the description serve to explain the principle of the present disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). $3^{rd}$ generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
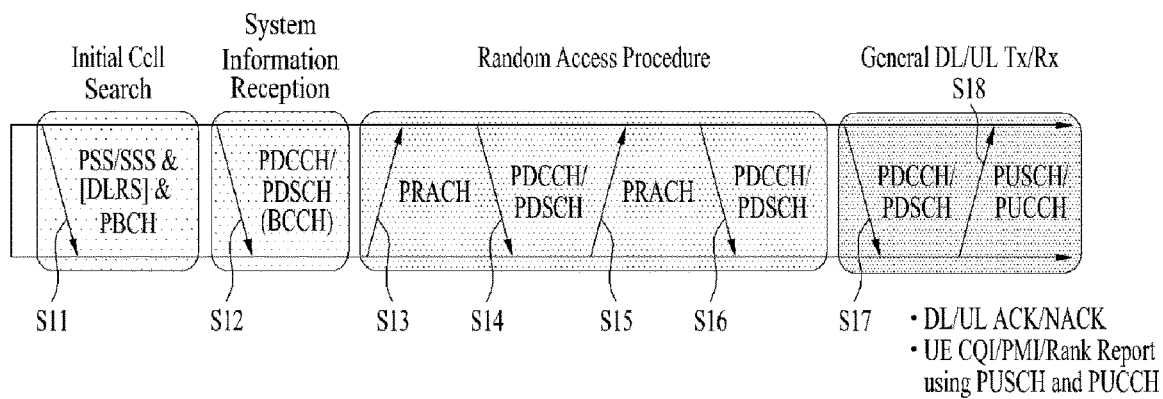
FIG. 1 illustrates physical channels and a general signal transmission method using the physical channels in a $3^{rd}$ generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

Figure 2:
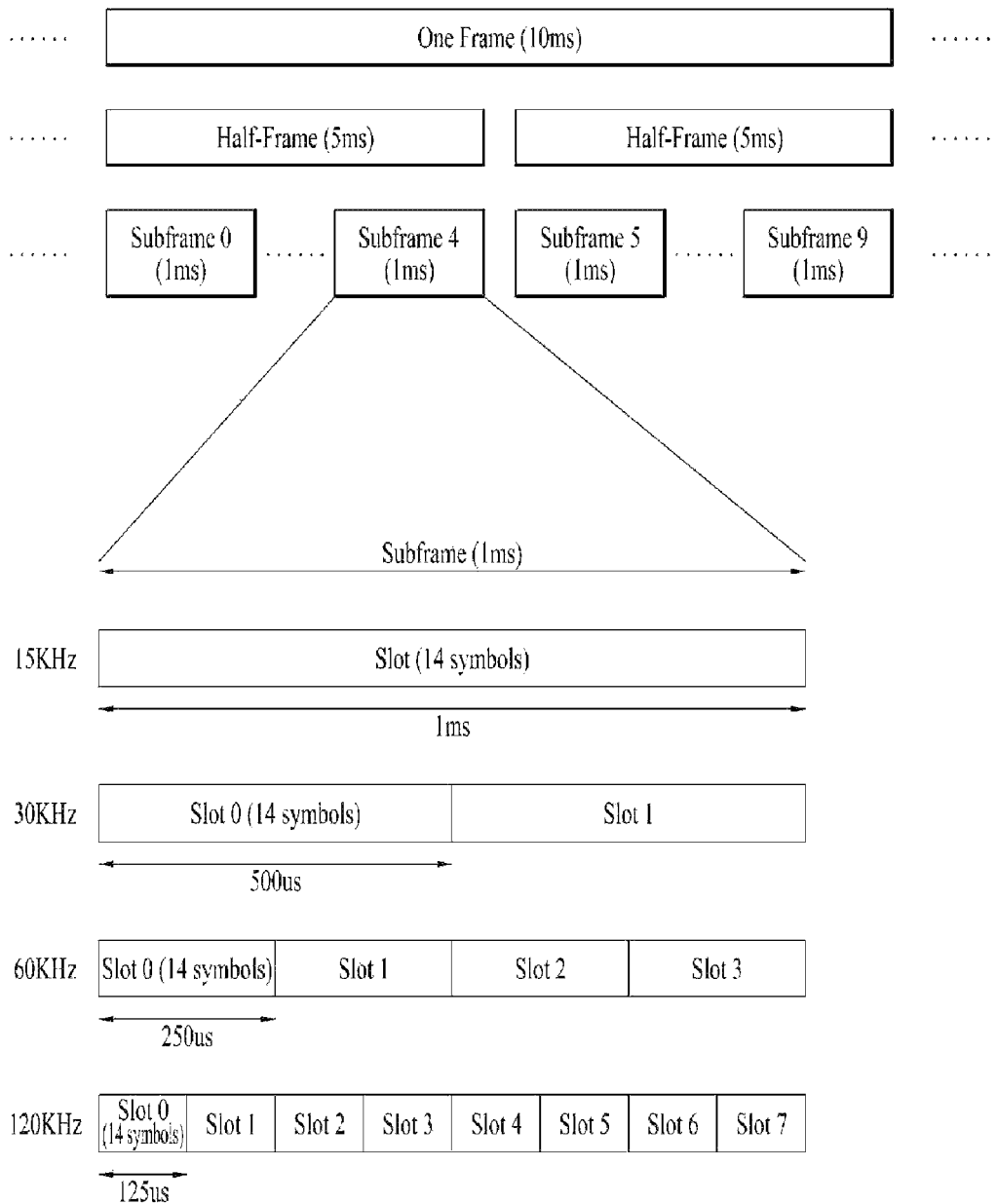
FIG. 2 illustrates a radio frame structure.

FIG. 2 is a diagram illustrating the structure of a radio frame

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

In the NR system, different OFDM(A) numerologies (e.g., SCS, CP length, etc.) may be configured for a plurality of cells aggregated for one UE. Thus, the (absolute time) duration of a time resource (e.g., subframe (SF), slot, or TTI) including the same number of symbols may differ between the aggregated cells (for convenience of description, such a time resource is commonly referred to as a time unit (TU)).

Figure 3:
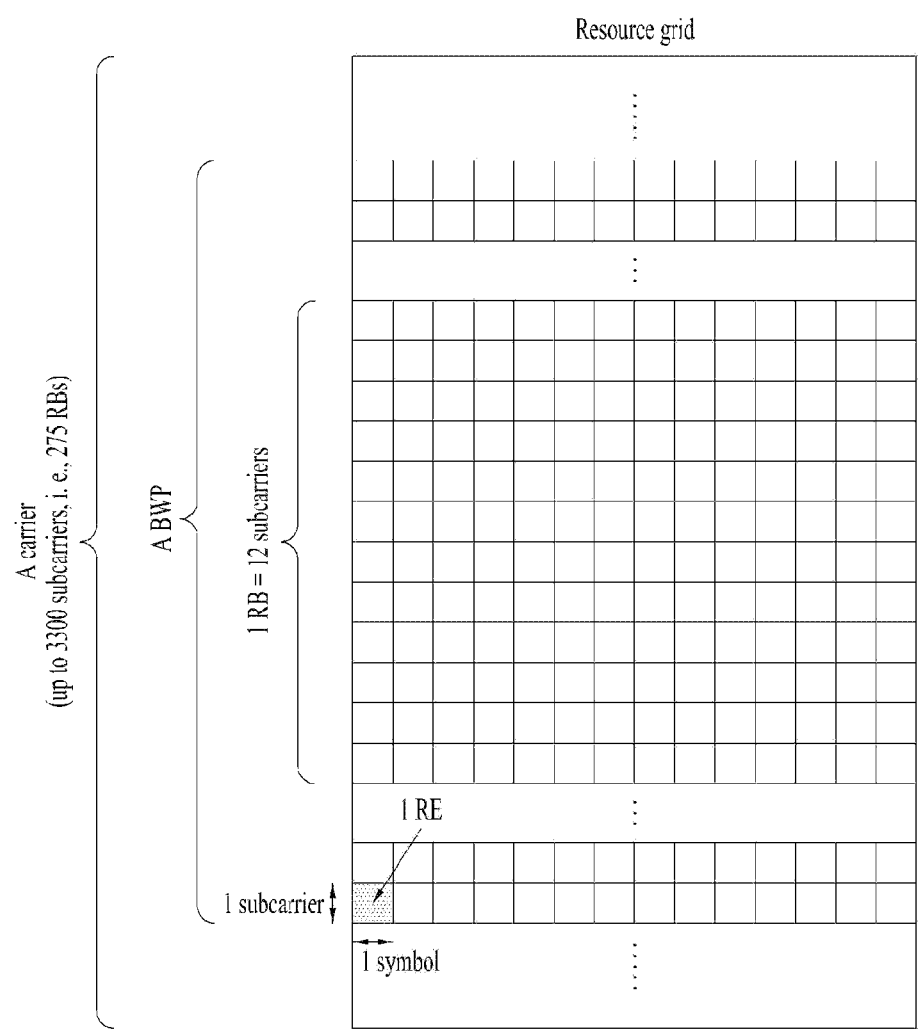
FIG. 3 illustrates a resource grid during the duration of a slot.

FIG. 3 illustrates a resource grid of a slot.

One slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
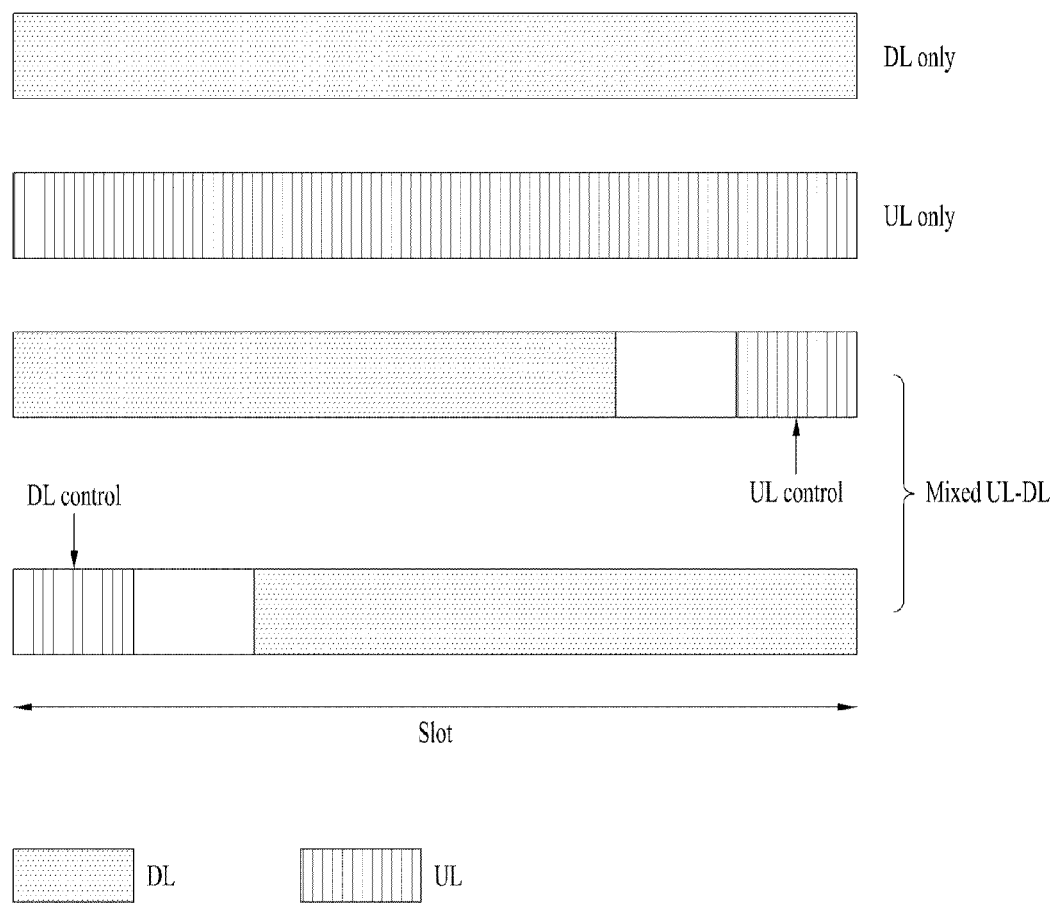
FIG. 4 illustrates a self-contained slot structure.

FIG. 4 illustrates a structure of a self-contained slot.

Figure 5:
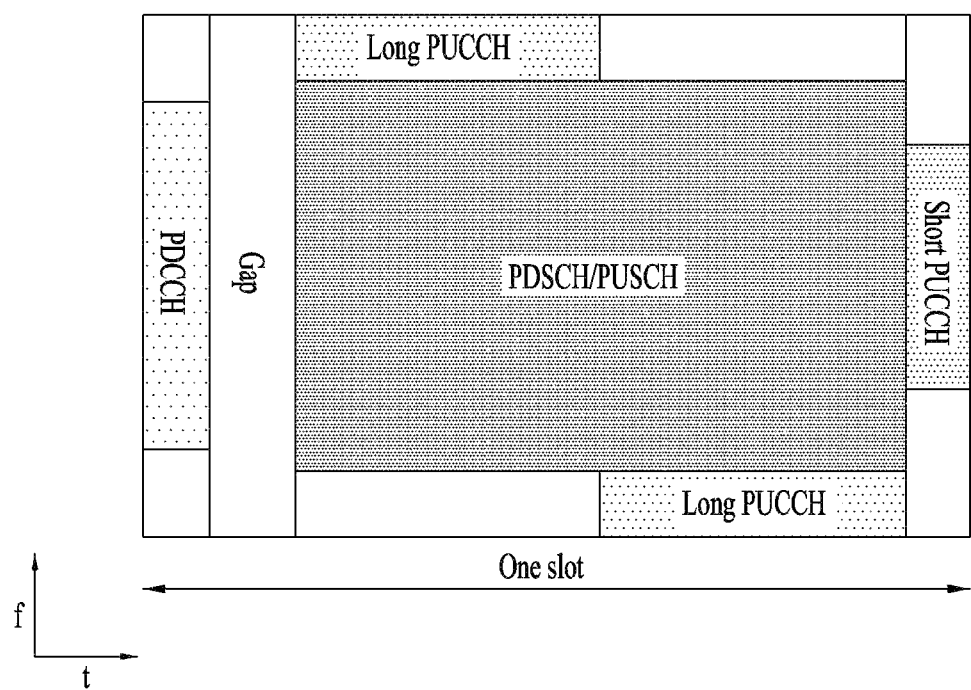
FIG. 5 illustrates mapping of physical channels in a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.
1. DL only configuration
2. UL only configuration
3. Mixed UL-DL configuration
    DL region+Guard period (GP)+UL control region
    DL control region+GP+UL region
        DL region: (i) DL data region, (ii) DL control region+DL data region
        UL region: (i) UL data region, (ii) UL data region+ UL control region FIG. 5 illustrates mapping of physical channels in a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Device-to-device (D2D) communication refers to a communication scheme in which a direct link is established between UEs and the UEs exchange voice and data directly without intervention of a BS. D2D communication may cover UE-to-UE communication and peer-to-peer communication. In addition, D2D communication may be applied to machine-to-machine (M2M) communication and machine type communication (MTC).

D2D communication is under consideration as a solution to the overhead of a BS caused by rapidly increasing data traffic. For example, since devices exchange data directly with each other without intervention of the BS by D2D communication, unlike legacy wireless communication, network overhead may be reduced. Further, it may be expected that the introduction of D2D communication will reduce procedures of the BS, reduce the power consumption of devices participating in D2D communication, increase data transmission rate, increase the accommodation capability of a network, distribute load, and extend cell coverage.

At present, vehicle-to-everything (V2X) communication in conjunction with D2D communication is under discussion. In concept, V2X communication covers vehicle-to-vehicle (V2V) communication for communication between vehicles, vehicle-to-pedestrian (V2P) communication for communication between a vehicle and a different kind of UE, and vehicle-to-infrastructure (V2I) communication for communication between a vehicle and a roadside unit (RSU).

Figure 6:
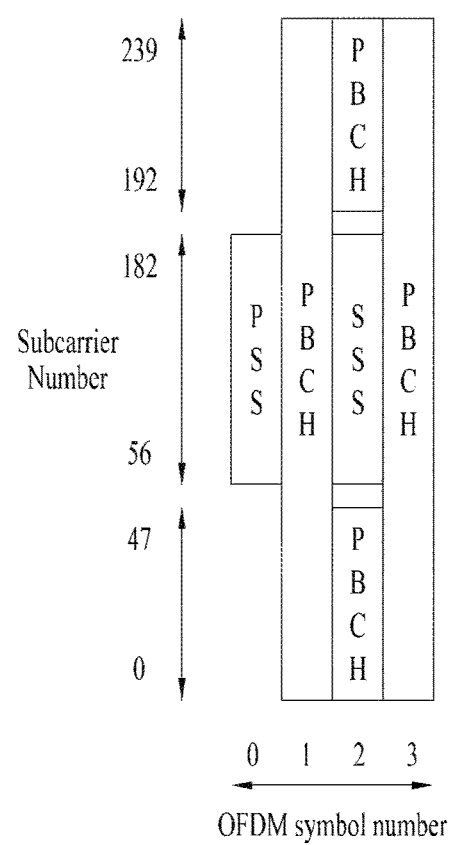
FIG. 6 illustrates an SSB structure.

FIG. 6 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

An SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 1 below.

TABLE 1

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | * Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) * Remaining Minimum System Information (RMSI) Control resource set (CORESET)/Search space configuration |
| 5th Step | PDCCH and PDSCH | Cell access information * RACH configuration |

There may be 336 cell ID groups each having three cell IDs. A total of 1008 cell IDs may be present, and a cell ID may be defined by Equation 1.

$$N_{ID}^{cell} = 3N_{ID}^{(1)} + N_{ID}^{(2)} \text{ where } N_{ID}^{(1)} \in \{0, 1, \ldots, 335\} \text{ and } N_{ID}^{(2)} \in \{0, 1, 2\}.$$ [Equation 1]

where $N_{ID}^{cell}$ denotes a cell ID (e.g., PCID). $N_{ID}^{(1)}$ denotes a cell ID group and is provided/acquired through an SSS. $N_{ID}^{(2)}$ denotes a cell ID in a cell ID group and is provided/acquired through a PSS.

A PSS sequence $d_{PSS}(n)$ may be defined to satisfy Equation 2.

$$d_{PSS}(n) = 1 - 2x(m)$$ [Equation 2]

$$m = (n + 43N_{ID}^{(2)}) \bmod 127 \text{, where}$$

$$0 \leq n < 127$$

$$x(i + 7) = (x(i + 4) + x(i)) \bmod 2, \text{ and}$$

$$[x(6) \; x(5) \; x(4) \; x(3) \; x(2) \; x(1) \; x(0)] = [1 \; 1 \; 1 \; 0 \; 1 \; 1 \; 0].$$

An SSS sequence $d_{SSS}(n)$ may be defined to satisfy Equation 3.

$$d_{SSS}(n) = [1 - 2x_0((n + m_0) \bmod 127)]$$ [Equation 3]

$$[1 - 2x_1((n + m_1) \bmod 127)]$$

$$m_0 = 15 \left\lfloor \frac{N_{ID}^{(1)}}{112} \right\rfloor + 5N_{ID}^{(2)} \text{, where}$$

$$m_1 = N_{ID}^{(1)} \bmod 112$$

$$0 \leq n < 127$$

$$x_0(i + 7) = (x_0(i + 4) + x_0(i)) \bmod 2$$
$$x_1(i + 7) = (x_1(i + 1) + x_1(i)) \bmod 2 \text{, and}$$

$$[x_0(6) \; x_0(5) \; x_0(4) \; x_0(3) \; x_0(2) \; x_0(1) \; x_0(0)] = [0 \; 0 \; 0 \; 0 \; 0 \; 0 \; 1]$$
$$[x_1(6) \; x_1(5) \; x_1(4) \; x_1(3) \; x_1(2) \; x_1(1) \; x_1(0)] = [0 \; 0 \; 0 \; 0 \; 0 \; 0 \; 1].$$

Figure 7:
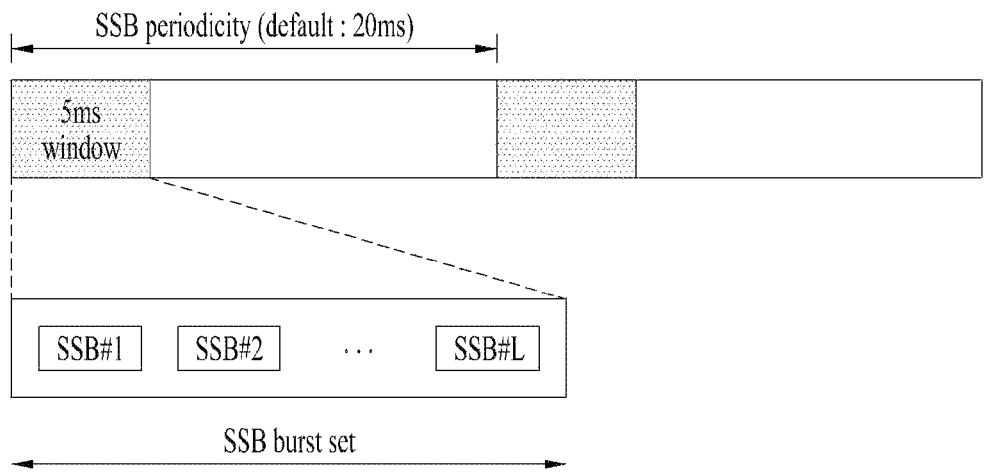
FIG. 7 illustrates SSB transmission.

FIG. 7 illustrates SSB transmission.

An SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame) and an SSB may be repeatedly transmitted up to L times within the SS burst set.

The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

Figure 8:
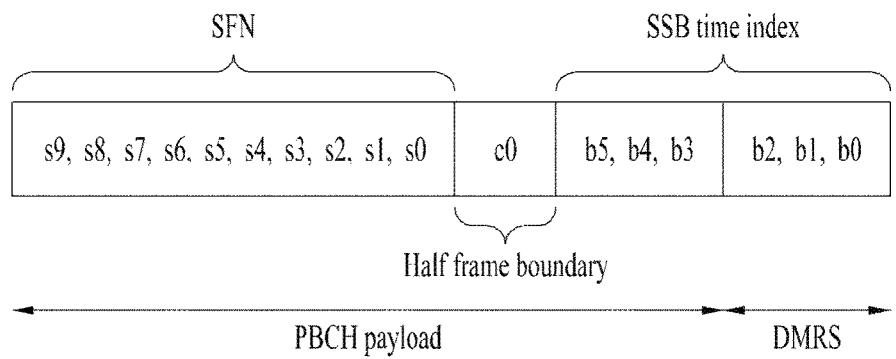
FIG. 8 illustrates exemplary acquisition of information about DL time synchronization at a UE

FIG. 8 illustrates exemplary acquisition of information about DL time synchronization at a UE.

The UE may acquire DL synchronization by detecting an SSB. The UE may identify the structure of an SSB burst set based on the index of the detected SSB, and thus detect a symbol/slot/half-frame boundary. The number of a frame/half-frame to which the detected SSB belongs may be identified by SFN information and half-frame indication information.

Specifically, the UE may acquire 10-bit SFN information, s0 to s9 from a PBCH. 6 bits of the 10-bit SFN information is acquired from a master information block (MIB), and the remaining 4 bits is acquired from a PBCH transport block (TB).

Subsequently, the UE may acquire 1-bit half-frame indication information c0 If a carrier frequency is 3 GHz or below, the half-frame indication information may be signaled implicitly by a PBCH DMRS. The PBCH DMRS indicates 3-bit information by using one of 8 PBCH DMRS sequences. Therefore, if L=4, the remaining one bit except for two bits indicating an SSB index in the 3-bit information which may be indicated by 8 PBCH DMRS sequences may be used for half-frame indication.

Finally, the UE may acquire an SSB index based on the DMRS sequence and the PBCH payload. SSB candidates are indexed from 0 to L−1 in a time order within an SSB burst set (i.e., half-frame). If L=8 or 64, three least significant bits (LSBs) b0 to b2 of the SSB index may be indicated by 8 different PBCH DMRS sequences. If L=64, three most significant bits (MSBs) b3 to b5 of the SSB index is indicated by the PBCH. If L=2, two LSBs b0 and b1 of an SSB index may be indicated by 4 different PBCH DMRS sequences. If L=4, the remaining one bit b2 except for two bits indicating an SSB index in 3-bit information which may be indicated by 8 PBCH DMRS sequences may be used for half-frame indication.

Figure 9:
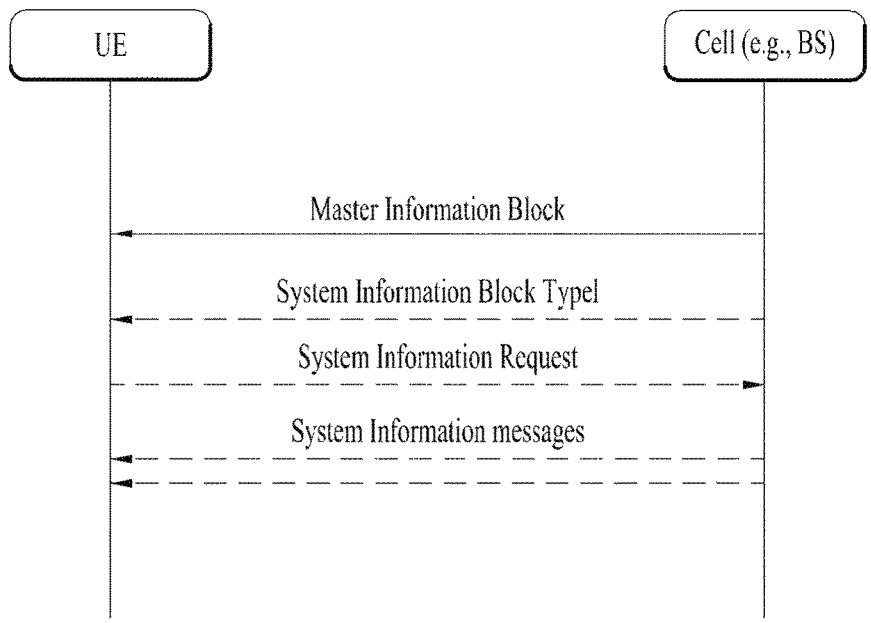
FIG. 9 illustrates a process of acquiring system information.

FIG. 9 illustrates a process of acquiring system information (SI). A UE may acquire access stratum (AS)/non-access stratum (NAS) information through the process of acquiring the SI. The process of acquiring the SI may be applied to a UE in an RRC_IDLE state, an RRC_INACTIVE state, and an RRC_CONNECTED state.

The SI is categorized into a master information block (MIB) and a plurality of system information blocks (SIBs). SI other than the MIB may be referred to as remaining minimum system information (RMSI). Details of the SI may refer to the following description.

The MIB includes information/parameters related to system information block type 1 (SIB1) reception and is transmitted on a PBCH of an SSB. During initial cell selection, the UE assumes that a half frame having the SSB is repeated at a periodicity of 20 ms. The UE may confirm whether there is a control resource set (CORESET) for a Type0-PDCCH common search space based on the MIB. The Type0-PDCCH common search space is a type of PDCCH search space and is used to transmit a PDCCH that schedules an SI message. When the Type0-PDCCH common search space is present, the UE may determine, based on information in the MIB (e.g., pdcch-ConfigSD31), (i) a plurality of consecutive RBs and one or more consecutive symbols constituting the CORESET, and (ii) a PDCCH occasion (i.e., a time domain position for PDCCH reception). When the Type0-PDCCH common search space is absent, pdcch-ConfigSD31 provides information about a frequency position at which the SSB/SIB1 is present and information about a frequency range in which the SSB/SIB1 is absent.

SIB1 includes information about availability and scheduling (e.g., a transmission period or an SI-window size) of remaining SIBs (hereinafter, SIBx where x is an integer equal to or larger than 2). For example, SIB1 may indicate whether SIBx is periodically broadcast or is provided at the request of the UE in an on-demand manner. When SIBx is provided in an on-demand manner, SIB1 may include information needed for the UE to perform an SI request. SIB1 is transmitted on a PDSCH. A PDCCH that schedules SIB1 is transmitted through the Type0-PDCCH common search space. SIB1 is transmitted on a PDSCH indicated by the PDCCH.

SIBx is included in the SI message and is transmitted on the PDSCH. Each SI message is transmitted in a time window (i.e., an SI-window) that is periodically generated.

Figure 10:
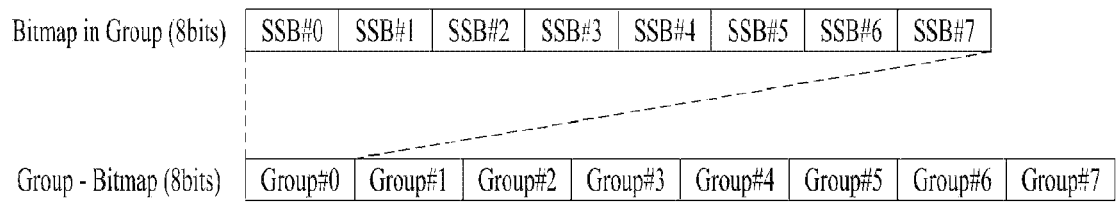
FIG. 10 illustrates an exemplary method of indicating actually transmitted SSBs.

FIG. 10 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

Hereinbelow, synchronization acquisition between UEs in sidelink (SL) communication will be described. In an OFDM system, when time/frequency is out of synchronization, OFDM signals may be incapable of being multiplexed between different UEs due to inter-cell interference. In order to adjust synchronization, it is inefficient for SL UEs to directly transmit and receive synchronization signals so that all UEs individually adjust synchronization. Accordingly, in a distributed node system such as SL, a specific node may transmit a representative synchronization signal and the remaining UEs may be synchronized with the representative synchronization signal. In other words, for SL signal transmission and reception, a method may be used in which some nodes (in this case, a node may be a BS, a UE, or a synchronization reference node (SRN)) transmit a sidelink synchronization signal (SLSS) and the remaining UEs transmit and receive signals in synchronization with the SLSS.

Figure 11:
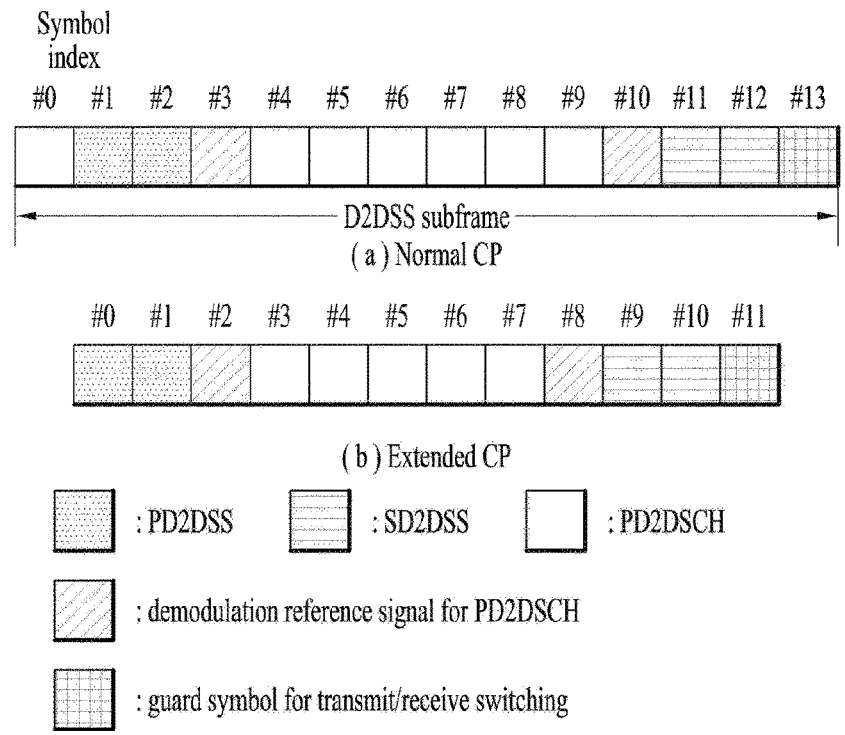
FIG. 11 illustrates a time resource unit in which SLSSs are transmitted.

The SLSS may include a primary sidelink synchronization signal (PSSS) and a secondary sidelink synchronization signal (SSSS). The PSSS may be configured to have a similar/modified/repeated structure of a Zadoff-Chu sequence of a predetermined length or a PSS. The PSSS may use a Zadoff-Chu root index (e.g., 26 or 37) different from that used by a DL PSS. For example, a generation formula of the PSSS may be equal to a generation formula of a DL PSS and a root index of the PSSS may be different from a root index of the DL PSS. A root index may vary according to a synchronization source and an SL UE may be aware of the synchronization source by detecting the PSSS. The SSSS may be configured to have a similar/modified/repeated structure of an M-sequence or an SSS. If UEs are synchronized with a BS, the BS serves as an SRN. Unlike the DL PSS/SSS, the PSSS/SSSS follows a UL subcarrier mapping scheme. FIG. 11 illustrates a time resource unit in which SLSSs are transmitted. The time resource unit may represent a subframe in LTE/LTE-A or a slot in 5G, and details thereof are disclosed in the specification of 3GPP TS 36 series or 38 series. A physical sidelink broadcast channel (PSBCH) may be a (broadcast) channel carrying basic (system) information that a UE should first obtain before SL signal transmission and reception (e.g., SLSS-related information, a duplex mode (DM), a TDD UL/DL configuration, resource pool-related information, the type of an application related to the SLSS, a subframe offset (or a time resource unit offset), broadcast information, etc.). The PSBCH may be transmitted in the same time resource unit as the SLSS or in a time resource unit subsequent to the SLSS.

A guard symbol may be used to when an SL UE switches transmission and reception on a time resource.

Unlike LTE, NR V2X may further include an automatic gain control (AGC) symbol for controlling a power range of transmission and reception signals.

The SRN may be a node that transmits the SLSS and/or the PSBCH. The SLSS may be a specific sequence, and the PSBCH may be a sequence representing specific information or may be a codeword produced by predetermined channel coding. The SRN may be a BS or a specific SL UE. In the case of partial network coverage or out-of-network coverage, the SRN may be a UE.

Figure 12:
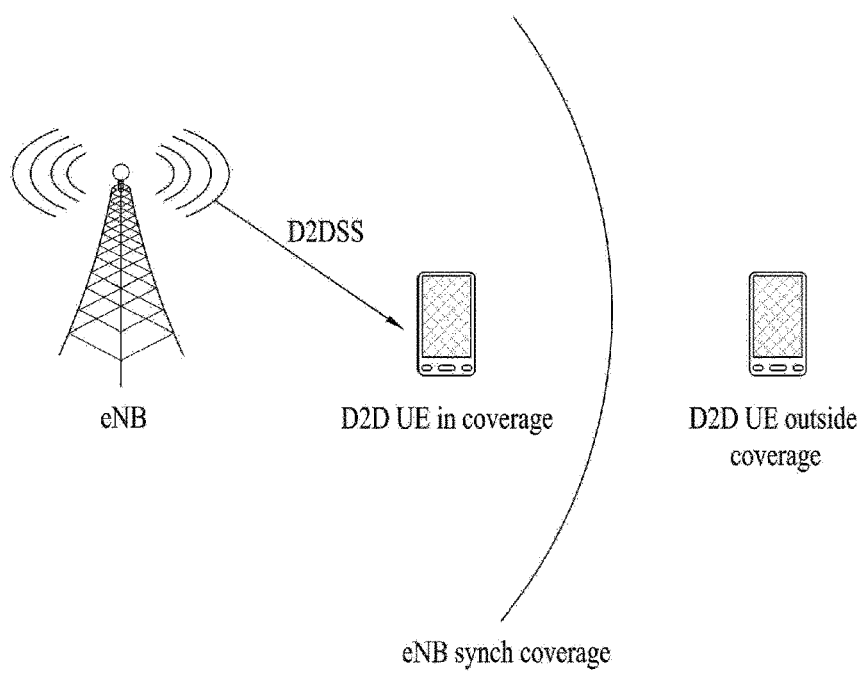
FIG. 12 illustrates a coverage state of a UE.

In a situation as illustrated in FIG. 12, an SLSS may be relayed for SL communication with an out-of-coverage UE. The SLSS may be relayed over multiple hops. The following description is given with the appreciation that relay of an SS covers transmission of the SLSS in a separate format according to an SS reception time as well as direct amplify-and-forward (AF)-relay of an SS transmitted by a BS. As the SLSS is relayed, an in-coverage UE may communicate directly with the out-of-coverage UE.

Figure 13:
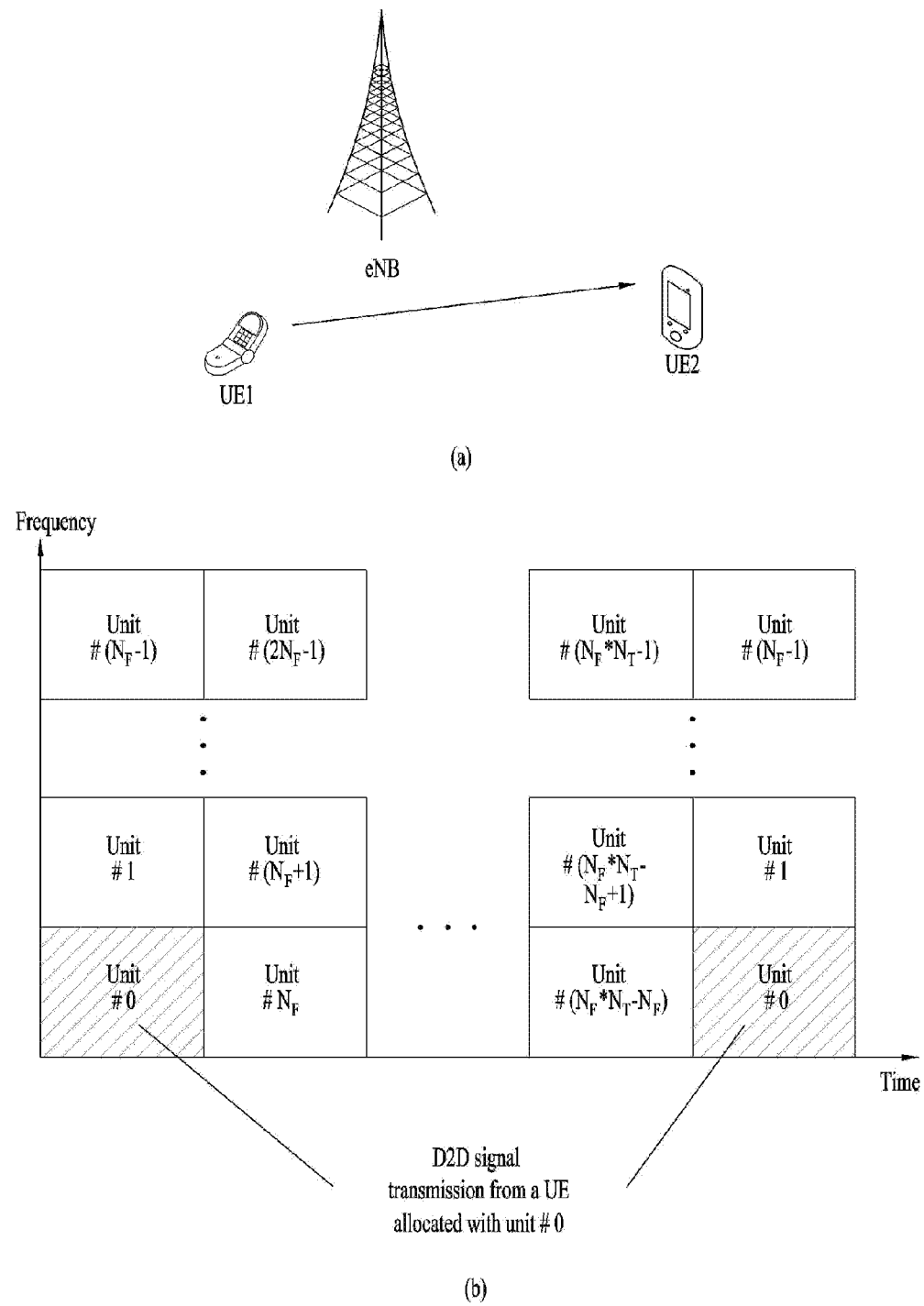
FIG. 13 illustrates a sidelink resource pool.

FIG. 13 illustrates an example of UE1, UE2, and an SL resource pool used by UE1 and UE2 performing SL communication. In FIG. 13(a), a UE corresponds to a terminal or such a network device as a BS transmitting and receiving a signal according to an SL communication scheme. A UE may select a resource unit corresponding to a specific resource from a resource pool corresponding to a set of resources and transmit an SL signal using the resource unit. UE2 corresponding to a receiving UE may receive a configuration of a resource pool in which UE1 is capable of transmitting a signal and may detect a signal of UE1 in the resource pool. In this case, if UE1 is located at the inside of coverage of a BS, the BS may inform UE1 of the resource pool. If UE1 is located at the outside of coverage of the BS, another UE may inform UE1 of the resource pool or the resource pool may be determined as predetermined resources. In general, a resource pool includes a plurality of resource units. A UE selects one or plural resource units and may use the selected resource unit(s) for SL signal transmission thereof. FIG. 13(b) illustrates an example of configuring a resource unit. Referring to FIG. 13(b), all frequency resources are divided into NF resource units and all time resources are divided into NT resource units, so that NF*NT resource units are defined in total. In this case, a resource pool may be repeated with a period of NT time units. In particular, as shown, one resource unit may periodically and repeatedly appear. Alternatively, an index of a physical resource unit to which a logical resource unit is mapped may change with a predetermined pattern according to time to obtain diversity gain in the time domain or frequency domain. In this resource unit structure, a resource pool may correspond to a set of resource units capable of being used by a UE intending to transmit an SL signal.

The resource pool may be classified into various types. First of all, the resource pool may be classified according to content of an SL signal transmitted via each resource pool. For example, the content of the SL signal may be classified and a separate resource pool may be configured according to content. The content of the SL signal may include scheduling assignment (SA) (or a physical sidelink control channel (PSCCH)), an SL data channel, and a discovery channel. SA may correspond to a signal including information on the position of a resource used by a transmitting UE to transmit a subsequent SL data channel, information on a modulation and coding scheme (MCS) necessary to demodulate a data channel, information on a MIMO transmission scheme, information on a timing advance (TA), and the like. The SA signal may be transmitted on an identical resource unit in a manner of being multiplexed with SL data. In this case, an SA resource pool may correspond to a pool of resources on which the SA signal and the SL data are transmitted in a manner of being multiplexed. The SA signal may also be referred to as an SL control channel or a physical sidelink control channel (PSCCH). The SL data channel (or physical sidelink shared channel (PSSCH)) may correspond to a resource pool used by the transmitting UE to transmit user data. If the SA signal and the SL data are transmitted in a manner of being multiplexed on an identical resource unit, only the SL data channel except SA information may be transmitted in a resource pool for the SL data channel. In other word, REs, which have been used to transmit the SA information on an individual resource unit of an SA resource pool, may also be used to transmit the SL data in an SL data channel resource pool. The discovery channel may correspond to a resource pool for a message that enables a neighboring UE to discover the transmitting UE transmitting information such as ID of the UE, and the like.

Even in the case of the same content, SL signals may use different resource pools according to the transmission and reception properties of the SL signals. For example, even in the case of the same SL data channels or the same discovery messages, the SL signals may be distinguished again by different resource pools according to transmission timing determination schemes for the SL signals (e.g., whether an SL signal is transmitted at the reception time of a synchronization reference signal or at a time resulting from applying a predetermined TA to the reception time of the synchronization reference signal), resource allocation schemes for the SL signals (e.g., whether a BS configures the transmission resources of an individual signal for an individual transmitting UE or the individual transmitting UE autonomously selects the transmission resources of an individual signal in a pool), the signal formats of the SL signals (e.g., the number of symbols occupied by each SL signal in one time resource unit or the number of time resource units used for transmission of one SL signal), signal strengths from the BS, the transmission power strength of an SL UE, and so on. In SL communication, a mode in which a BS directly indicates transmission resources to an SL transmitting UE is referred to as SL transmission mode 1, and a mode in which a transmission resource area is preconfigured or the BS configures the transmission resource area and the UE directly selects transmission resources is referred to as SL transmission mode 2. In SL discovery, a mode in which the BS directly indicates resources is referred to as Type 2, and a mode in which the UE selects transmission resources directly from the preconfigured resource area or the resource area indicated by the BS is referred to as Type 1.

Figure 14:
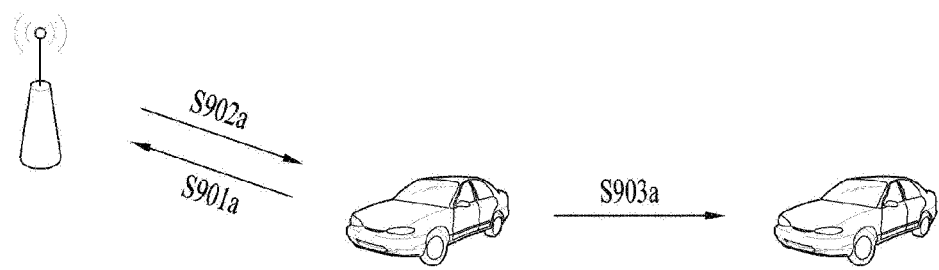
FIG. 14 illustrates a scheduling scheme according to a transmission mode.
Figure 14:
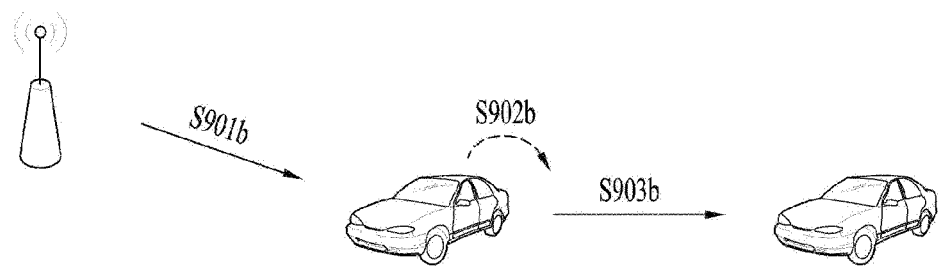
Figure 15:
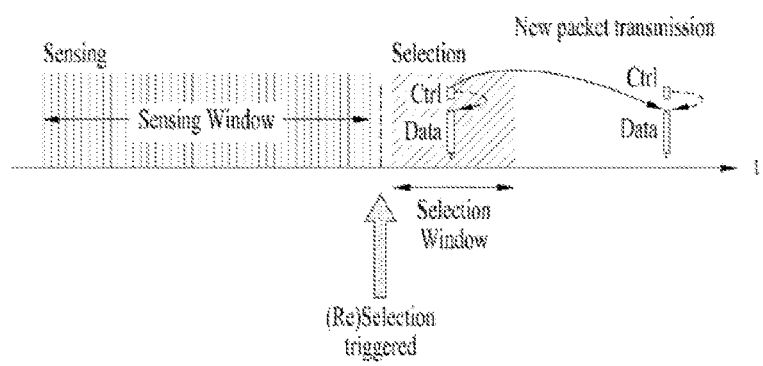
FIG. 15 illustrates selection of transmission resources.

In V2X, SL transmission mode 3 based on centralized scheduling and SL transmission mode 4 based on distributed scheduling are used. FIG. 14 illustrates scheduling schemes according to these two transmission modes. Referring to FIG. 14, in transmission mode 3 based on centralized scheduling of FIG. 14(a), when a vehicle makes a request for SL resources to a BS (S901a), the BS allocates the resources (S902a), and the vehicle transmits a signal on the resources to another vehicle (S903a). In the centralized transmission scheme, resources of another carrier may also be scheduled. In contrast, in distributed scheduling corresponding to transmission mode 4 illustrated in FIG. 14(b), while sensing resources, i.e., a resource pool, preconfigured by the BS (S901b), a vehicle selects transmission resources (S902b) and then transmits a signal on the selected resources to another vehicle (S903b). When the transmission resources are selected, transmission resources for the next packet are also reserved, as illustrated in FIG. 15. In V2X, each MAC packet data unit (PDU) is transmitted twice. When resources for initial transmission are selected, resources for retransmission are also reserved with a time gap from the resources for the initial transmission. For details of resource reservation, see Section 14 of 3GPP TS 36.213 V14.6.0, which is incorporated herein as background art.

A UE in SL transmission mode 1 may transmit a PSCCH (or an SL control signal or SL control information (SCI)) on resources configured by a BS. A UE in SL transmission mode 2 receives a configuration of resources to be used for SL transmission from the BS. The UE may transmit the PSCCH by selecting time and frequency resources from among the configured resources.

Figure 16:
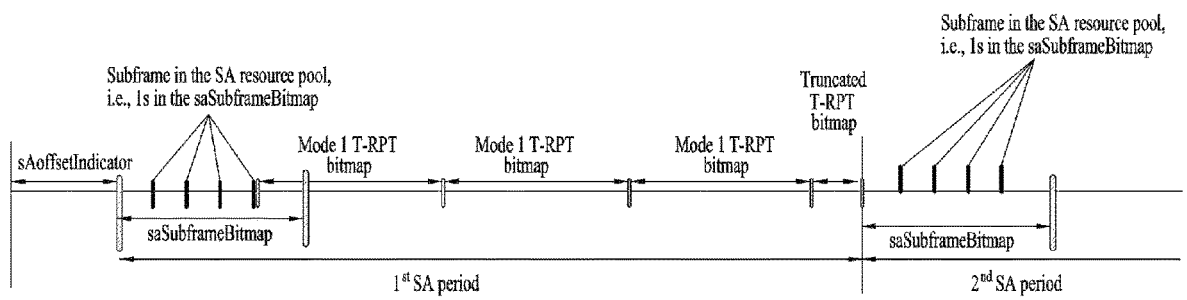
FIG. 16 illustrates a PSCCH period.

In SL transmission mode 1 or 2, a PSCCH period may be defined as illustrated in FIG. 16. Referring to FIG. 16, the first PSCCH period may be started in a time resource unit separated by a predetermined offset indicated by higher layer signaling from a specific system frame. Each PSCCH period may include a PSCCH resource pool, and a time resource unit pool for SL data transmission. The PSCCH resource pool may include the first time resource unit of the PSCCH period to the last time resource unit among time resource units indicated as carrying the PSCCH by a time resource unit bitmap. The resource pool for SL data transmission may determine a time resource unit used for actual data transmission by applying a time-resource pattern for transmission (T-RPT) (or a time-resource pattern (TRP)) in mode 1. As illustrated, when the number of time resource units included in the PSCCH period except for the PSCCH resource pool is larger than the number of T-RPT bits, the T-RPT may be repeatedly applied, and the last T-RPT may be applied by truncating as many time resource units as the number of the remaining time resource units. A transmitting UE may perform transmission at T-RPT positions corresponding to is in a T-RPT bitmap, and one MAC PDU is transmitted four times.

Figure 17:
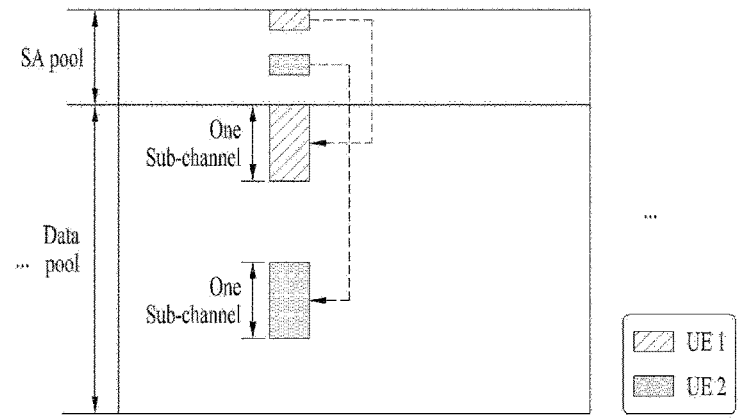
FIG. 17 illustrates transmission schemes of a PSCCH and a PSSCH.
Figure 17:
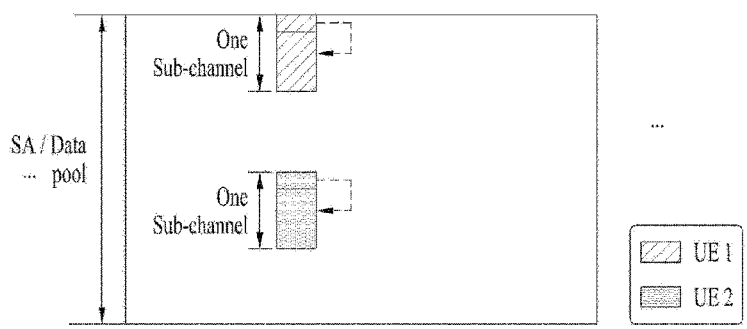

Unlike SL, a PSCCH and data (PSSCH) are transmitted through frequency division multiplexing (FDM) in V2X, that is, SL transmission mode 3 or 4. Because latency reduction is a significant factor in V2X in view of the nature of vehicle communication, the PSCCH and data are transmitted through FDM on different frequency resources of the same time resources. Examples of this transmission scheme are illustrated in FIG. 17. The PSCCH and the data may not be contiguous to each other as illustrated in FIG. 17(*a*) or may be contiguous to each other as illustrated in FIG. 17(*b*). Herein, a basic transmission unit is a subchannel. The subchannel is a resource unit including one or more RBs on the frequency axis on predetermined time resources (e.g., a time resource unit). The number of RBs included in the subchannel, that is, the size of the subchannel and the starting position of the subchannel on the frequency axis, are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as direction and speed, static data of the vehicle, such as dimensions, an ambient illumination state, details of a path, and so on. The CAM may be 50 bytes to 300 bytes in length. The CAM is broadcast, and latency thereof should be shorter than 100 ms. The DENM may be generated, upon occurrence of an unexpected incident such as breakdown or an accident of a vehicle. The DENM may be shorter than 3000 bytes and may be received by all vehicles within a transmission range. The DENM may have a higher priority than the CAM. When it is said that a message has a higher priority, this may mean that from the perspective of one UE, in the case of simultaneous transmission of messages, the higher-priority message is transmitted first, or earlier in time than any other of a plurality of messages. From the perspective of multiple UEs, a message having a higher priority may be subjected to less interference than a message having a lower priority, to thereby have a reduced reception error probability. Regarding the CAM, the CAM may have a larger message size when the CAM includes security overhead than when the CAM does not include security overhead.

Figure 18:
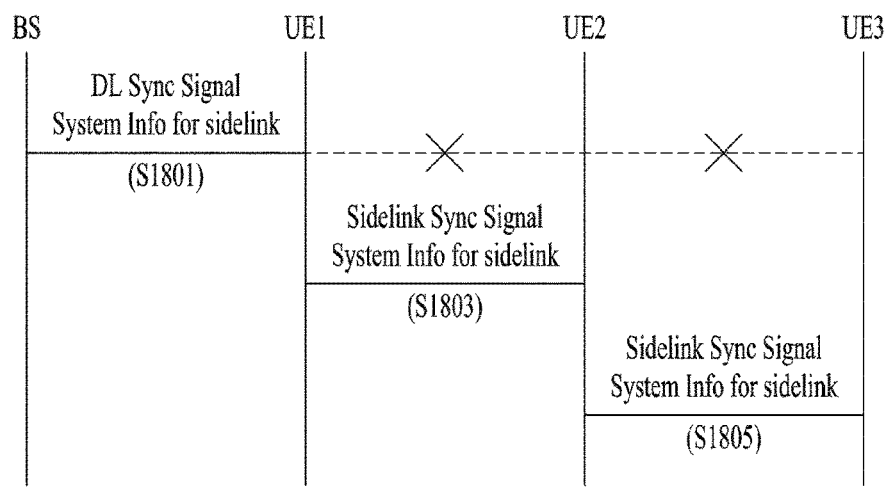
FIG. 18 illustrates a procedure of configuring resources for D2D by a BS and transmitting and receiving a D2D synchronization signal between UEs.

FIG. 18 illustrates a procedure of configuring resources for D2D by a BS and transmitting and receiving a D2D synchronization signal between UEs. The BS transmits a DL SS and transmits SI for SL (S1801). Among UEs, UE1 detects the DL SS transmitted by the BS and obtains the SI for SL transmitted by the BS. In this case, UE2 and UE3 may not obtain such information.

UE1 may transmit an SLSS using the D2D resources allocated by the BS (at least a frequency resource may be predetermined for SL transmission, and a time resource uses a resource allocated by the BS). In addition, UE1 transmits the SI for SL obtained from the BS to neighboring UEs (S1803). UE2 located in the vicinity of UE1 is in a state in which UE2 fails to obtain the SI for SL from the BS and attempts to detect the SLSS at the predetermined frequency position. Upon detecting the SS transmitted by UE1, UE2 obtains the SI for SL transmitted by UE1.

Next, UE2 may transmit the SLSS and the SL SI based on the SL SI obtained from UE1 (S1805). UE3 in out-of-coverage performs SLSS detection on a predetermined resource. Upon detecting the SLSS transmitted by UE2, UE3 obtains the SL SI transmitted by UE2.

An out-of-coverage UE may also transmit an SL signal at the predetermined frequency position.

In this situation, embodiments of the SLSS transmitted between UEs may be implemented as follows.

An NR UE attempts to detect an SS/PBCH block at a candidate frequency position (SS raster) at which the SS/PBCH block is capable of being transmitted during initial cell access. Although an NR V2X UE may be indicated to transmit the SS/PBCH block at a frequency position which is not defined as the SS raster, the case in which the UE needs to transmit a sidelink synchronization signal block (S-SSB) at a frequency position contiguous to the SS raster or at the SS raster when a frequency bandwidth used by a network is not wide may occur. In this case, the NR UE may detect both an SSB of NR Uu and an S-SSB of NR V2X. In other words, upon detecting the SSB, since the NR UE is unaware of whether the SSB is a DL SSB of a cellular network or an SSB of SL, the NR UE may generate a sequence of a PSSS sequence and an SSSS different from that of a DL PSS and a DL SSS.

Hereinafter, synchronization acquisition between UEs in SL communication of an NR system will be described.

In a distributed node system such as SL, a specific node transmits a representative SS and the remaining UEs may be synchronized with the representative SS. That is, for SL transmission and reception, a method in which some nodes (in this case, a node may be a global navigation satellite system (GNSS), a BS, an eNB, a gNB, an NR UE, an LTE/NR V2X SL UE, an NR V2X SL UE, or the like) transmit an SS and the other UEs transmit and receive signals in synchronization with the SS may be used.

An SLSS may include a PSSS and an SSSS. An S-SSB or an S-SS/PSBCH block may include a PSSS, an SSSS, and a PSBCH.

Hereinbelow, in order to distinguish between a DL SS transmitted by a BS in a general cellular communication environment and an SLSS for SL signal transmission and reception, a description will be given by focusing on a method of configuring a sequence of the SLSS different from that of the DL SS.

Hereinbelow, an (NR) PSS and an (NR) SSS will refer to a DL SS in a cellular communication environment of a general NR system, and an (NR) PSSS and an (NR) SSSS will refer to an SLSS in an NR SL communication environment.

PSSS Sequence

A PSSS may be a similar/modified/repeated structure of an m-sequence of a predetermined length or an NR PSS. The PSSS may be generated using a cyclic shift, an initial value, or a polynomial, which is different from a cyclic shift, an initial value, or a polynomial of the NR PSS, In an NR system, a total of three PSS sequences may be defined and a length-127 m-sequence is used. A polynomial for obtaining the PSS sequence uses $x(i+7)=(x(i+4)+x(i))$ mod 2. An initial value of the PSS sequence uses $[x(6)\ x(5)\ x(4)\ x(3)\ x(2)\ x(1)\ x(0)]=[1\ 1\ 1\ 0\ 1\ 1\ 0]$. To generate the three PSS sequences, three cyclic shifts may be used in the frequency domain and the cyclic shifts may use $\{0, 43, 86\}$. Sequences mapped to REs in the frequency domain may be shifted by about N adjacent REs, due to an influence of a frequency offset and Doppler frequency/Doppler spread that exist when the PSS is detected, and this may bring about the same effect as mapping of N cyclically shifted sample sequences to REs. Accordingly, there is a problem that it is difficult to distinguish between sequences having cyclic shifts of an offset in the range of about 0 to N in an initial access procedure. The NR PSS generates an NR PSS sequence by selecting cyclic shift values sufficiently spaced from each other such that it may be considered that there is no influence of a shift in the frequency domain. (When 127 is divided by 3, then 42 or 43 is obtained. In generating three sequences, cyclic shift values having the longest distance therebetween are selected.)

In the NR system, when considering a frequency band, a maximum movement speed, and the inaccuracy of an oscillator of the UE, it may be assumed that a sequence is shifted by about +/−2 REs from a specific subcarrier spacing. In this situation, when configuring a sequence for the NR PSSS, cyclic shift values having as long a distance as possible from the cyclic shift values used to generate the NR PSS sequence, except for the cyclic shift values used to generate the NR PSS sequence, may be used to generate the NR PSSS sequence.

The NR PSS sequence uses a length-127 (=L) m-sequence, and cyclic shift values used to generate 3 (=M) sequences are designed to have an interval of about L/3 (43=ceiling (127/3). If a polynomial and an initialization value for generating the NR PSSS sequence are the same as a polynomial and an initialization value of the NR PSS sequence, it is desirable to select cyclic shift values used to generate the NR PSSS sequence such that the interval between the cyclic shift values for the NR PSSS is maximized in consideration of an offset of the cyclic shift values for the NR PSS sequence. For example, when an offset of ceiling (L/3) is used for the PSS, it is desirable to select a value corresponding to ½ of the offset interval used for the PSS (ceiling (offset/2) or floor (offset/2)) as the cyclic shift values for an additional PSSS sequence. That is, the cyclic shift values for generating the PSSS sequence may be determined based on a predetermined ratio value for the offset of the cyclic shift values for the PSS.

If the NR PSS sequence uses 0, 43, and 86 as the cyclic shift values, the NR PSSS sequence may use some of values 21 (or 22), 64 (or 65), and 107 (or 108) as the cyclic shift values. For example, two of three values may be selectively used. Although the cyclic values for the PSSS sequence are different from the cyclic values for the PSS sequence, the interval between the cyclic shift values for the PSS sequence may be equal to the interval between the cyclic shift values for the PSSS sequence as ceiling(L/3), i.e., 43. However, this is purely exemplary and the interval between the cyclic shift values for the PSSS sequence may be different from the interval between the cyclic shift values for the PSS sequence.

As another method capable of distinguishing the NR PSSS from the NR PSS when configuring the NR PSSS sequence, the same polynomial as a polynomial of the NR PSS and an initial value different from an initial value of the NR PSS may be used. In this case, the cyclic shift values for the NR PSSS sequence may be appropriately selected according to the number of required sequences and select values having as long a distance as possible between the NR PSSS sequence and the NR PSS sequence without overlapping with the cyclic shift values of the NR PSS sequence.

As still another method capable of distinguishing the NR PSSS from the NR PSS when configuring the NR PSSS sequence, a polynomial different from a polynomial of the NR PSS is used.

A plurality of NR PSSS sequences may be selectively used according to purpose.

For example, a plurality of NR PSSS sequences may be used for the purpose of indicating a coverage state of a UE. Some of the sequences may be used by an out-of-coverage UE, and other sequences may be used by an in-coverage UE. An SL UE may be aware of a coverage state of an SL UE that has transmitted an SS by receiving the NR PSSS and performing signal detection. Alternatively, an SL UE may discern the type of SI that an SL UE that has transmitted the SS desires to transmit by receiving the NR PSSS and performing signal detection.

SSSS Sequence

An SSSS may have a similar/modified/repeated structure of a Gold sequence of a predetermined length or the NR SSS.

A cyclic shift, an initial value, or a polynomial of the SSSS may be different from a cyclic shift, an initial value, or a polynomial of the NR SSS The SSS sequence defined in the NR system is based on two length-127 m-sequences and the SSS sequence is finally generated by multiplication of elements included in the m-sequences.

Specifically, the NR SSS sequence uses a length-127 Gold sequence. A polynomial $x0(i+7)=(x0(i+4)+x0(i))$mod 2, which is applied to the NR PSS, is used for one m-sequence of the two m-sequences, and a polynomial $x1(i+7)=(x1(i+1)+x1(i))$mod 2 is used for the other m-sequence of the two m-sequences. $[x0(6)\ x0(5)\ x0(4)\ x0(3)\ x0(2)\ x0(1)\ x0(0)]=[0\ 0\ 0\ 0\ 0\ 0\ 1]$ and $[x1(6)\ x1(5)\ x1(4)\ x1(3)\ x1(2)\ x1(1)\ x1(0)]=[0\ 0\ 0\ 0\ 0\ 0\ 1]$ are used as initial values of the polynomials, respectively. A total of 1008 sequences is generated. In the first m-sequence, 9 sequences are generated using cyclic shifts ($\{0, 5, 10, \ldots, 40\}$) with an offset of 5 and, in the second m-sequence, 112 sequences are generated using cyclic shifts ($\{0, 1, 2, \ldots, 111\}$) with an offset of 1. 1008 (=9*112) sequences are generated by multiplication of elements included in the two m-sequences (i.e., element-wise multiplication (modulo 2)). The NR SSS sequences are grouped into three groups according to three NR PSS sequences, and each group consists of 336 sequences (0 to 335, 336 to 671, and 672 to 1007). The NR SSSS may use some groups selected based on the number of NR PSSS sequences from among the three groups. For example, when the NR PSSS is generated based on two cyclic shift values, the NR SSSS may use two of the three groups.

As one method of distinguishing between the NR SSSS sequence and the NR SSS sequence, there is a method of generating the SSSS sequence by selecting cyclic shifts different from cyclic shifts used for the NR SSS sequence. Since the NR SSS sequence characteristically generates two m-sequences by a modulo operation, a Gold sequence which is distinguishable from a Gold sequence of the NR SSS may be generated even when cyclic shift values different from cyclic shift values used for one of the two m-sequences are applied. If a total of 9 cyclic shift values is used by applying an offset of 5 to the first m-sequence of the NR SSS sequence, the NR SSSS sequence may select a total of N values by applying an offset of M from among cyclic shift values unused for the NR SSS sequence. For example, if the NR SSS sequence is used in the range of 0 to 40, the NR SSSS sequence may select cyclic shift values from the remaining sequences 45 to 122 outside the range of the NR SSS sequence. Similar to the NR SSS, if an offset of 5 is considered, values of {45, 50, 55, 60, 65, 70} may be used. In this case, the other m-sequence may be generated at an offset of 1.

As another method of distinguishing between the NR SSSS sequence and the NR SSS sequence when configuring the NR SSSS sequence, the same polynomial as a polynomial for the NR SSS sequence and an initial value different from an initial value for the NR SSS sequence may be used.

As still another method of distinguishing between the NR SSSS sequence and the NR SSS sequence when configuring the NR SSSS sequence, a polynomial different from a polynomial for the NR SSS is used.

A plurality of NR SSSS sequences may be selectively used according to purpose.

The NR SSSS sequences may be used for the purpose of indicating a synchronization source of a UE. For example, since various nodes such as a GNSS, a gNB, an eNB, and an LTE V2X UE may be synchronization sources. The SSSS may be used for the purpose of indicating which node is a synchronization resource. The SSSS may also be used to indicate in-coverage or out-of-coverage. In the case of an in-coverage UE, the NR SSSS sequences may be used to specify the synchronization sources. Through mapping to indexes of the NR SSSS sequences, a specific index range may be used to designate in-coverage, and another index range may be used to designate out-of-coverage. An SL UE may be aware of the coverage state of an SL UE that has transmitted an SS by receiving the NR SSSS and performing signal detection. Alternatively, an SL UE may distinguish the type of SI that an SL UE that has transmitted the SS desires to transmit by receiving the NR SSSS and detecting the signal.

Figure 19:
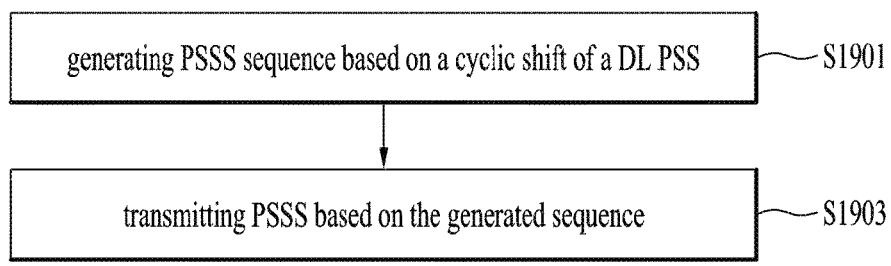
FIGS. 19 and 20 illustrate signal transmission processes according to an embodiment of the present disclosure.
Figure 20:
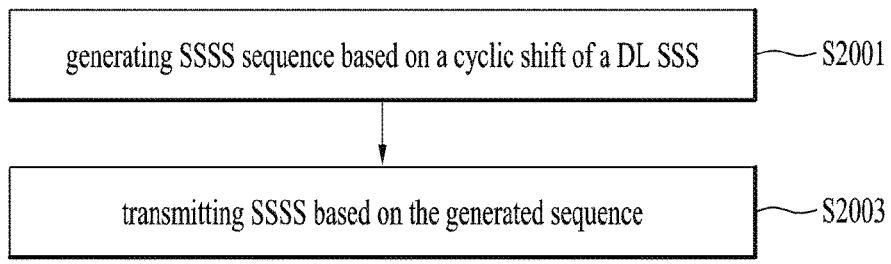

FIGS. 19 and 20 illustrate signal transmission processes according to the present disclosure.

FIG. 19 illustrates a process of transmitting a PSSS, and FIG. 20 illustrates a process of transmitting an SSSS.

Referring to FIG. 19, a first device may generate a sequence of the PSSS based on a specific cyclic shift value (S1901), and transmit the PSSS to the second device based on the generated sequence (S1903). The specific cyclic shift value may be one of a plurality of cyclic shift (hereinafter, referred to as first cyclic shift) values for the PSSS. The number of the plural first cyclic shift values may be three. The plural first cyclic shift values may be determined by applying a predetermined ratio to an offset of cyclic shift (hereinafter referred to as second cyclic shift) values for a DL PSS sequence. In this case, the plural first cyclic shift values may be selected such that an interval between the first cyclic shift values is maximized. For example, if the second cyclic shift values are (0, 43, 86), an offset is 43, and the predetermined ratio is ½, the first cyclic shift values may be (21, 64, 107) or (22, 65, 108). As an exemplary embodiment of the present disclosure, while 43 is equally applied as the offset of the first cyclic shift values and the offset of the second cyclic shift values, different offsets of the PSSS and the DL PSS may be applied.

Referring to FIG. 20, the first device may generate a sequence of the SSSS based on cyclic shift values (hereinafter referred to as third cyclic shift values or fifth cyclic shift values) of the DL SSS (S2001) and transmit the SSSS to the second device based on the generated sequence (S2003).

For example, the first device may generate a first sequence of the SSSS based on a sequence of the DL SSS having an offset of 5. When 9 third cyclic shift values, 0, 5, . . . , 40, of the DL SSS are available, fourth cyclic shift values for the first sequence of the SSSS may be 45, 50, and the like having the same offset of 5 in a range not included in (not overlapped with) the third cyclic shift values 0 to 40.

The first device may generate a second sequence of the SSSS based on the sequence of the DL SSS having an offset of 1. The fifth cyclic shift values of the DL SSS may have an offset of 1, and a total of 112 values may be used. Sixth cyclic shift values for the second sequence of the SSSS may have the same values as the fifth cyclic shift values, with an offset of 1, which is the same as an offset of the DL SSS. Alternatively, the sixth cyclic shift values may be selected from a range not overlapped with the fifth cyclic shift values, with an offset of 1, which is the same as the offset of the DL SSS.

As an embodiment of the present disclosure, while the offset of the fourth cyclic shift values and the offset of the sixth cyclic shift values are equally applied as 5, and the offset of the fifth cyclic shift values and the offset of the sixth cyclic shift values are equally applied as 1, different offsets of the PSSS and the DL SSS may be applied.

In another embodiment of the present disclosure, in addition to using the aforementioned cyclic shift values and offsets, the PSSS sequence and the SSSS sequence may be configured such that the DL PSS and the DL SSS use polynomials different from polynomials of the PSSS and the SSSS, respectively, or use the same polynomials as polynomials of the PSSS and the SSSS, respectively, and initial values different from initial values of the DL PSS and the DL SSSS, respectively.

For an SLSS of NR, a synchronization reference may be indicated by distinguishing between SSIDs. 672 SL SSIDs may be divided into two groups and may be used to indicate priority.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 21:
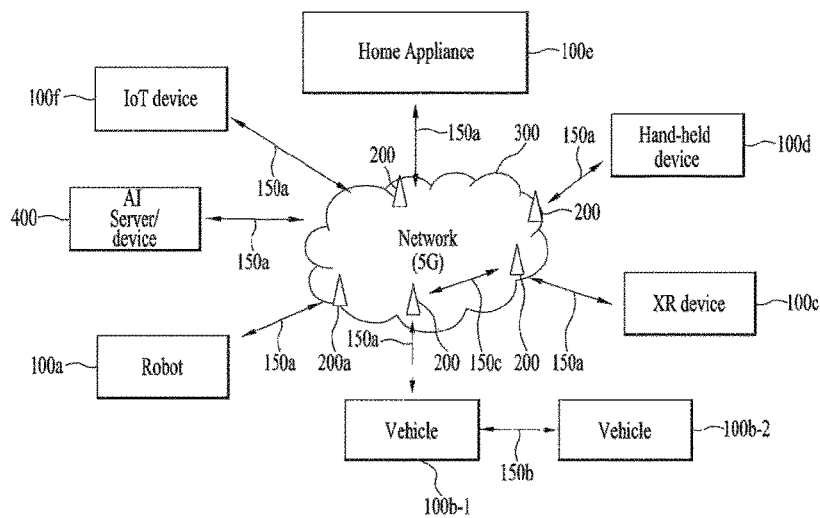
FIG. 21 illustrates an exemplary communication system applied to the present disclosure.

FIG. 21 illustrates a communication system 1 applied to the present disclosure.

Referring to FIG. 21, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., SL communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, SL communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 22:
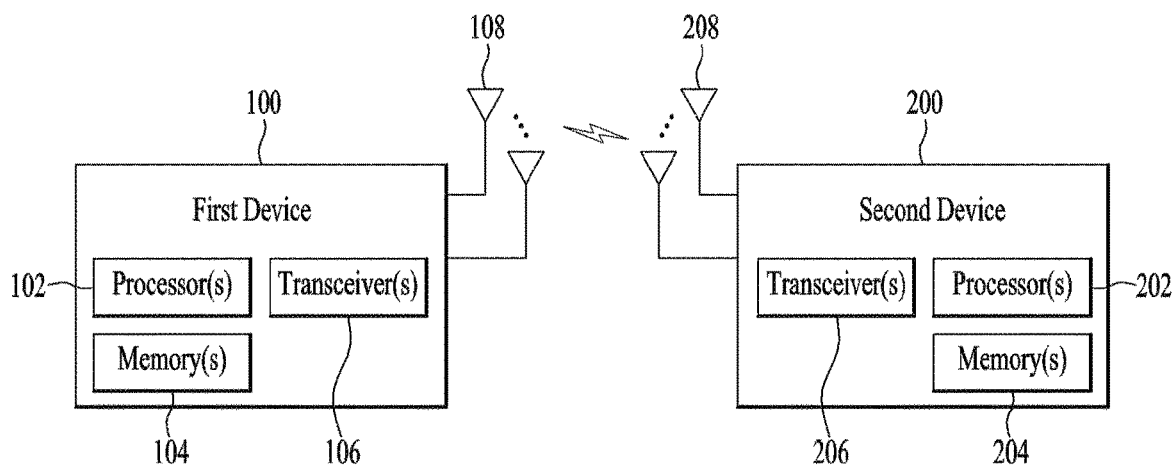
FIG. 22 illustrates an exemplary wireless device applicable to the present disclosure.

FIG. 22 illustrates wireless devices applicable to the present disclosure.

Referring to FIG. 22, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 23:
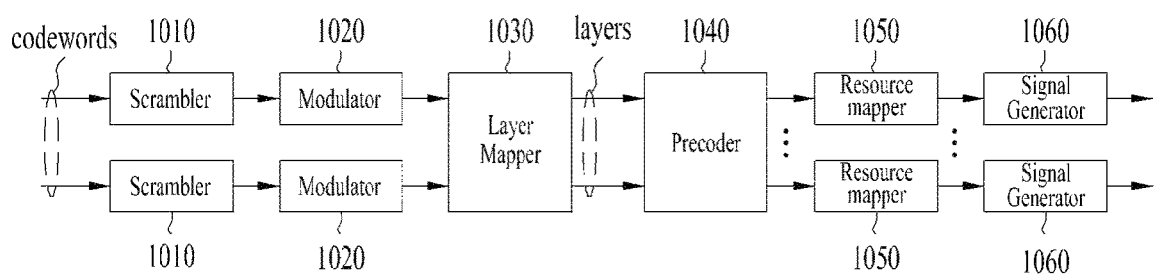
FIG. 23 illustrates an exemplary signal processing circuit to which embodiments of the present disclosure are applied.

FIG. 23 illustrates a signal processing circuit for Tx signals.

Referring to FIG. 23, a signal processing circuit 1000 may include a scrambler 1010, a modulator 1020, a layer mapper 1030, a precoder 1040, a resource mapper 1050, and a signal generator 1060. The operations/functions shown in FIG. 23 may be performed by the processors 102 and 202 and/or the transceivers 106 and 206 shown in FIG. 22, without being limited thereto. Hardware elements shown in FIG. 23 may be implemented by the processors 102 and 202 and/or the transceivers 106 and 206 shown in FIG. 23. For example, the blocks 1010 to 1060 may be implemented by the processors 102 and 202. In addition, the blocks 1010 to 1050 may be implemented by the processors 102 and 202 shown in FIG. 22, and the block 1060 may be implemented by the transceivers 106 and 206 shown in FIG. 22.

The codeword may be converted into a radio signal (or a radio frequency (RF) signal) through the signal processing circuit 1000 shown in FIG. 23. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK(pi/2-Binary Phase Shift Keying), m-PSK (m-Phase Shift Keying), m-QAM (m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an inverse fast Fourier transform (IFFT) module, a cyclic prefix (CP) inserter, a digital-to-analog converter (DAC), a frequency uplink converter, etc.

Figure 25:
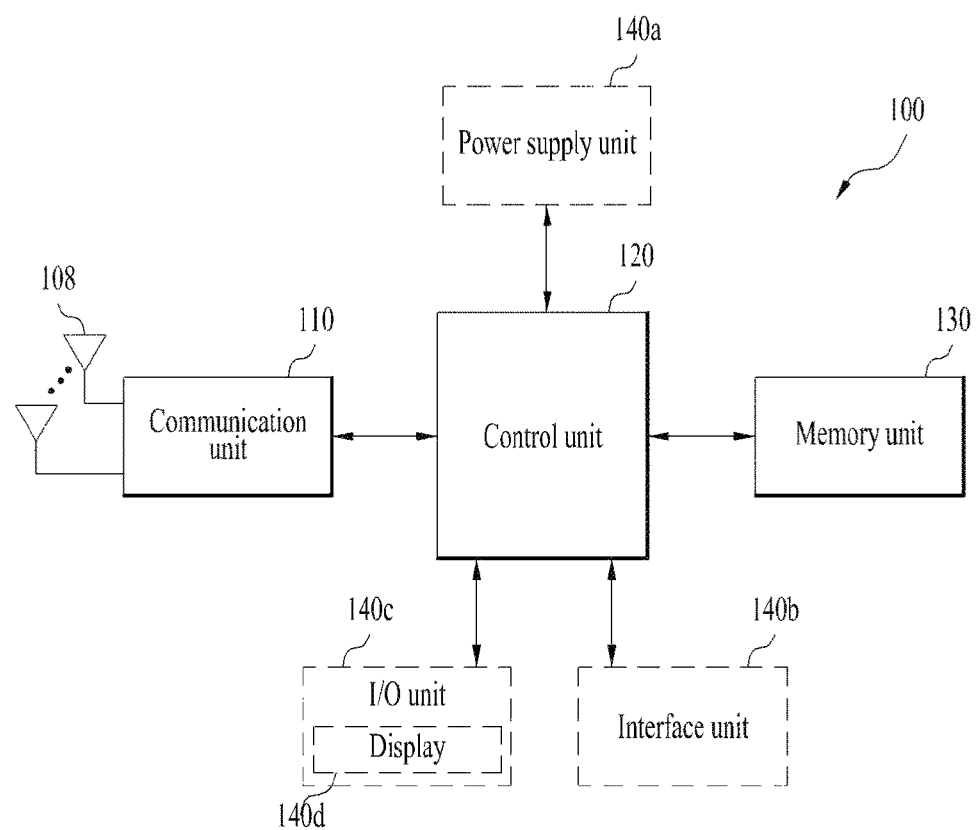
FIG. 25 illustrates a hand-held device applied to the present disclosure.

The signal processing steps for reception (Rx) signals in the wireless device may be arranged in the reverse order of the signal processing steps 1010 to 1060 shown in FIG. 25. For example, the wireless devices 100 and 200 (shown in FIG. 20) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

Figure 24:
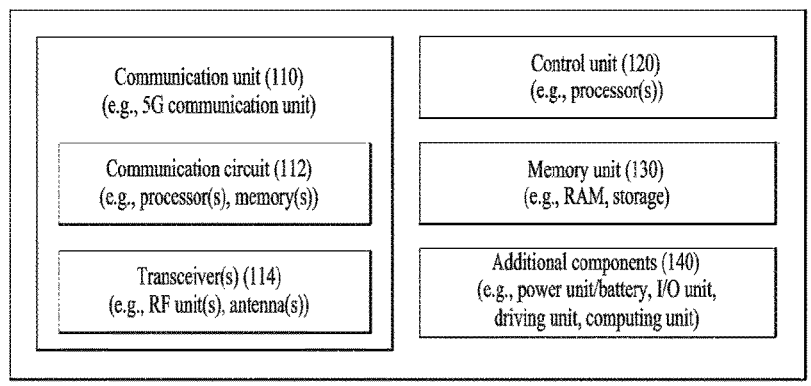
FIG. 24 illustrates another exemplary wireless device applicable to the present disclosure.

FIG. 24 illustrates another example of a wireless device applied to the present disclosure. The wireless device may be implemented in various forms according to a use case/service (refer to FIG. 21).

Referring to FIG. 24, wireless devices 100 and 200 may correspond to the wireless devices 100 and 200 of FIG. 22 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 28. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcasting terminal, a hologram device, a public safety device, an MTC device, a medical device, a FinTech device (or a finance device), a security device, a climate/environment device, the AI server/device (400 of FIG. 21), the BSs (200 of FIG. 21), a network node, or the like. The wireless device may be mobile or fixed according to a use case/service.

In FIG. 24, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

FIG. 25 is a block diagram illustrating a hand-held device 100 to which another embodiment of the present disclosure can be applied. The hand-held device may include a smartphone, a tablet (also called a smartpad), a wearable device (e.g., a smartwatch or smart glasses), and a portable computer (e.g., a laptop). The hand-held device 100 may be referred to as a mobile station (MS), a user terminal (UT), a mobile subscriber station (MSS), a subscriber station (SS), an advanced mobile station (AMS), or a wireless terminal (WT).

Referring to FIG. 25, the hand-held device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. The blocks 110 to 130/140a to 140c correspond to the blocks 110 to 130/140 of FIG. 24, respectively.

The communication unit 110 may transmit and receive signals (e.g., data and control signals) to and from another wireless device and a BS. The control unit 120 may perform various operations by controlling elements of the hand-held device 100. The control unit 120 may include an application processor (AP). The memory unit 130 may store data/parameters/programs/code/commands required for operation of the hand-held device 100. Further, the memory unit 130 may store input/output data/information. The power supply unit 140a may supply power to the hand-held device 100, and include a wired/wireless charging circuit and a battery. The interface unit 140b may support connection between the hand-held device and other external devices. The interface unit 140b may include various ports (e.g., an audio I/O port and a video I/O port) for connection to external devices. The I/O unit 140c may receive or output video information/signal, audio information/signal, data, and/or user-input information. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signals in the memory unit 130. The communication unit 110 may convert the information/signals into radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 26:
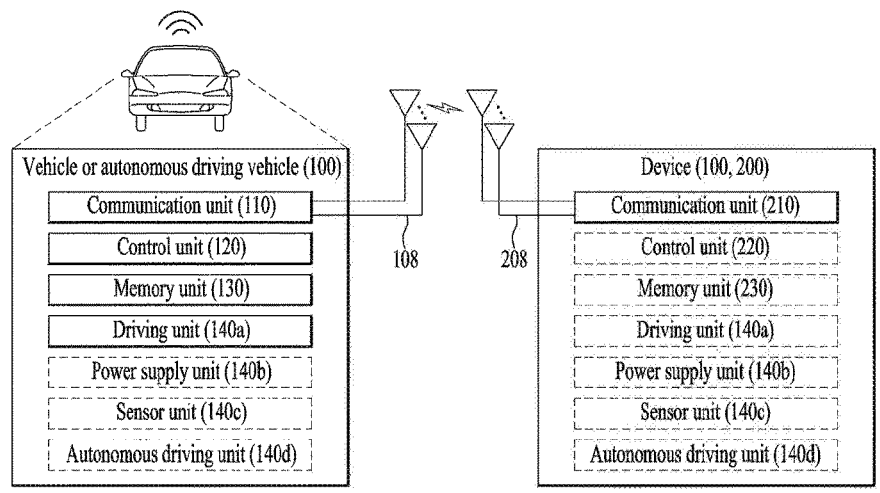
FIG. 26 illustrates an exemplary vehicle or autonomous driving vehicle applicable to the present disclosure.

FIG. 26 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein The present disclosure may be used for a UE, a BS, or other devices of a wireless mobile communication system.

What is claimed is:

1. A method for transmitting a Sidelink Synchronization Signal and Physical Sidelink Broadcast Channel Block (S-SS/PSBCH block) by a user equipment (UE) in a wireless communication system, the method comprising:
    obtaining a first cyclic shift (CS) value among first CS values for a Primary Sidelink Synchronization Signal (PSSS) based on whether the UE is in-coverage or out-of-coverage;
    generating the PSSS based on the first CS value;
    generating a Secondary Sidelink Synchronization Signal (SSSS) by multiplying a first M-sequence and a second M-sequence; and
    transmitting a S-SS/PSBCH block including the PSSS and the SSSS,
    wherein the first CS values are values such that each of intervals between each of the first CS values and each of second CS values for a Primary Synchronization Signal (PSS) is maximized,
    wherein a first CS value based on the UE being in-coverage and a first CS value based on the UE being out-of-coverage are different from each other, and
    wherein the first M-sequence is based on third CS values being such that each of intervals between each of the third CS values is 5, the second M-sequence is based on forth CS values being such that each of intervals between each of the forth CS values is 1.

2. The method of claim 1, wherein the each of first CS values is based on applying ceiling function or a floor function to a half value of the each of second CS values.

3. The method of claim 1, wherein a first polynomial is used for the PSSS and two second polynomials are used for the SSSS.

4. The method of claim 3, wherein one of two second polynomials is same with the first polynomial.

5. The method of claim 4, wherein initial values for one of two second polynomials and initial values for first polynomial are different.

6. A user equipment (UE) for transmitting a Sidelink Synchronization Signal and Physical Sidelink Broadcast Channel Block (S-SS/PSBCH block) in a wireless communication system, the UE comprising:
    at least one transceiver;
    at least one processor; and
    at least one computer memory operably connectable to the at least one processor and storing instructions that, when executed by the at least one processor, perform operations comprising:
    obtaining a first cyclic shift (CS) value among first CS values for a Primary Sidelink Synchronization Signal (PSSS) based on whether the UE is in-coverage or out-of-coverage;
    generating the PSSS based on the first CS value;
    generating a Secondary Sidelink Synchronization Signal (SSSS) by multiplying a first M-sequence and a second M-sequence; and
    transmitting, via the at least one transceiver, a S-SS/PSBCH block including the PSSS and the SSSS,
    wherein the first CS values are values such that intervals between each of the first CS values and each of second CS values for a Primary Synchronization Signal (PSS),
    wherein a first CS value based on the UE being in-coverage and a first CS value based on the UE being out-of-coverage are different from each other, and
    wherein the first M-sequence is based on CS value being 5, the second M-sequence is based on CS value being 1.

7. The UE of claim 6, wherein the each of first CS values is based on applying ceiling function or a floor function to a half value of the each of second CS values.

8. The UE of claim 6, wherein a first polynomial is used for the PSSS and two second polynomials are used for the SSSS.

9. The UE of claim 8, wherein one of two second polynomials is same with the first polynomial.

10. The UE of claim 9, wherein initial values for one of two second polynomials and initial values for first polynomial are different.

11. An apparatus for transmitting a Sidelink Synchronization Signal and Physical Sidelink Broadcast Channel Block (S-SS/PSBCH block) in a wireless communication system, the apparatus comprising:
    at least one processor; and
    at least one computer memory operably connectable to the at least one processor and storing instructions that, when executed by the at least one processor, perform operations comprising:
    obtaining a first cyclic shift (CS) value among first CS values for a Primary Sidelink Synchronization Signal (PSSS) based on whether the UE is in-coverage or out-of-coverage;
    generating the PSSS based on the first CS value;
    generating a Secondary Sidelink Synchronization Signal (SSSS) by multiplying a first M-sequence and a second M-sequence; and
    transmitting a S-SS/PSBCH block including the PSSS and the SSSS,
    wherein the first CS values are values such that intervals between each of the first CS values and each of second CS values for a Primary Synchronization Signal (PSS),
    wherein a first CS value based on the UE being in-coverage and a first CS value based on the UE being out-of-coverage are different from each other, and
    wherein the first M-sequence is based on CS value being 5, the second M-sequence is based on CS value being 1.

* * * * *